(12) United States Patent
Kotlaja et al.

(10) Patent No.: US 10,295,370 B2
(45) Date of Patent: May 21, 2019

(54) INTEGRATED SHAFT BEARING FOR A SENSOR

(71) Applicant: Continental Teves AG & Co. oHG, Frankfurt (DE)

(72) Inventors: Aleksandar Kotlaja, Frankfurt am Main (DE); Thomas Krohn, Schwalbach (DE); Stephan Risch, Weiterstadt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/504,185

(22) PCT Filed: Sep. 24, 2015

(86) PCT No.: PCT/EP2015/072035
§ 371 (c)(1),
(2) Date: Feb. 15, 2017

(87) PCT Pub. No.: WO2016/046341
PCT Pub. Date: Mar. 31, 2016

(65) Prior Publication Data
US 2017/0276511 A1   Sep. 28, 2017

(30) Foreign Application Priority Data
Sep. 25, 2014   (DE) .................. 10 2014 219 390

(51) Int. Cl.
*G01D 5/12*   (2006.01)
*G01D 5/14*   (2006.01)
*G01D 11/24*   (2006.01)

(52) U.S. Cl.
CPC .............. *G01D 5/12* (2013.01); *G01D 5/145* (2013.01); *G01D 11/245* (2013.01)

(58) Field of Classification Search
CPC ............ G01D 5/12; G01D 5/145; G01D 5/04; G01D 5/2046; G01D 5/2073; G01D 11/245; G01D 11/30; B62D 6/10
See application file for complete search history.

(56) References Cited

U.S. PATENT DOCUMENTS

| 9,360,348 B2 | 6/2016 | Henzler et al. |
| 2004/0139619 A1* | 7/2004 | Tateishi ................. G01D 5/145 33/1 PT |

(Continued)

FOREIGN PATENT DOCUMENTS

| CN | 103688141 A | 3/2014 |
| DE | 19733719 C1 | 4/1999 |

(Continued)

OTHER PUBLICATIONS

International Search Report and Written Opinion for International Application No. PCT/EP2015/072035, dated Nov. 20, 2015, 8 pages.

(Continued)

*Primary Examiner* — Lee E Rodak
*Assistant Examiner* — Melissa J Koval
(74) *Attorney, Agent, or Firm* — RatnerPrestia (57) ABSTRACT

A sensor device for detecting rotation, having a position transmitter with a shaft element having first and second shaft ends. The rotation to be detected is introduced via the first shaft end. The shaft element contains a magnet element at the second shaft end, a sensor element for detecting the rotation of the magnet element, and a housing part with at least two sections are separated from each other. The shaft element of the position transmitter is mounted on the first section, and the sensor element is arranged in the second section. The housing part and the shaft element each have a first bearing portion shaped so as to taper towards the shaft end in the region of the second shaft end, the shaft element (Continued)

supported on the housing part on the first bearing portion in order to support the position transmitter on the housing part.

15 Claims, 5 Drawing Sheets

(56) References Cited

U.S. PATENT DOCUMENTS

| | | | | |
|---|---|---|---|---|
| 2004/0174159 | A1* | 9/2004 | Ramirez | G01D 5/145 |
| | | | | 324/207.13 |
| 2004/0257068 | A1 | 12/2004 | Wolber et al. | |
| 2006/0274485 | A1* | 12/2006 | Godoy | G01D 5/12 |
| | | | | 361/622 |
| 2010/0134997 | A1* | 6/2010 | Heim | F16H 59/105 |
| | | | | 361/807 |
| 2014/0047913 | A1* | 2/2014 | Waite | G01M 17/007 |
| | | | | 73/117.01 |
| 2015/0185005 | A1* | 7/2015 | Bartscht | G01C 9/06 |
| | | | | 33/365 |

FOREIGN PATENT DOCUMENTS

| | | |
|---|---|---|
| DE | 102007034099 A1 | 1/2009 |
| DE | 102011118775 B3 | 4/2013 |
| DE | 102014218684 A1 | 3/2016 |
| EP | 1729093 A2 | 12/2006 |
| EP | 1729094 A1 | 12/2006 |
| WO | 2014005964 A1 | 1/2014 |

OTHER PUBLICATIONS

German Search Report for German Application No. 10 2015 218 425.0, dated May 13, 2016, with partial translation, 9 pages.
Decision for Grant of Patent for Korean Application No. 10-2017-7006730, dated Jun. 26, 2018, with translation, 3 pages.
Chinese Office Action with Search Report for Chinese Application No. 201580048615.4, dated Dec. 28, 2018, 24 pages.

* cited by examiner

INTEGRATED SHAFT BEARING FOR A SENSOR

CROSS REFERENCE TO RELATED APPLICATIONS

This application is the U.S. National Phase Application of PCT/EP2015/072035, filed Sep. 24, 2015, which claims priority to German Patent Application No. 10 2014 219 390.7, filed Sep. 25, 2014, the contents of such applications being incorporated by reference herein.

FIELD OF THE INVENTION

The invention relates to a sensor device for sensing a rotation.

BACKGROUND OF THE INVENTION

A ride-height sensor is known from DE 10 2007 034 099 A1, which is incorporated by reference. The ride-height sensor shown in said document has a lever arm which is connected at a first end to a moving element. At the other end, the lever arm is connected to a shaft, wherein the shaft has a signal-emitting element such that the rotation of the lever arm is able to be determined via the movement of the shaft. The shaft is fitted within a housing. The shaft 14 circumferentially has, at its end remote from the lever arm, a rotationally symmetrical collar having a shoulder. The collar is located in a corresponding collar receiving region of the bearing chamber, the diameter of which is greater than the diameter of the rest of the bearing chamber. The solution shown in said document has the drawback that the shaft cannot be formed integrally with the lever element.

DE 10 2011 118 775 B3, which is incorporated by reference, shows a similar ride-height sensor, wherein, in order to be mounted, the shaft has a portion in the form of a spherical cap. Although it is possible, by means of the portion in the form of a spherical cap, to introduce the shaft into the housing part and latch it in place therein, it is relatively complicated to produce the portion in the form of a spherical cap with a precise fit.

SUMMARY OF THE INVENTION

Therefore, an aspect of the invention is a sensor device having a shaft element that is able to be produced easily and is able to be incorporated into a housing of the sensor device with little effort.

An aspect of the invention is based on the basic idea of using the portion that narrows toward the shaft end to make it easy to produce radial and axial mounting of the shaft element of the position encoder. The narrowing of the bearing portion can be realized by means of a portion that narrows continuously or is shaped in the form of a cone. However, it is also conceivable to realize the narrowing in a stepped manner. The latter variant can be realized for example by means of a blind hole. In any case, the shaft element bears on the housing part in the region of the bearing portion such that the shaft element is supported both in the radial direction and in an axial direction. In the case of the stepped configuration of the bearing portion, at least one contact face oriented transversely to the longitudinal axis of the shaft and an adjoining contact face, extending radially about the longitudinal axis, between the shaft element and the housing part are produced.

The arrangement of the narrowing portion at the second shaft end, where a magnet element is also arranged as signal encoder, has the advantage that this positionally sensitive region is mounted directly and thus remains in an accurate position. As a result, even with one bearing portion, sufficient positional accuracy of the shaft element can be ensured. As a result of the shape narrowing toward the shaft end, the shaft element can also be inserted into the interior of the housing part from the outside and/or from above, such that it is possible to form the shaft element integrally with the lever element and at the same time to mount it in one step inside the housing part, wherein further adjustment steps thereof are not taken into consideration. This structure also simplifies the separation of the two portions of the housing part and thus also the separation of the sensor element from external influences which can exist inside the first portion of the housing part.

Within the meaning of an aspect of the invention, the term bearing portion is used to describe a portion or region in which the shaft element or housing part is shaped in accordance with the invention in order to mount the shaft element on the housing part. Therefore, the bearing portions on the shaft element and on the housing part are oriented with respect to one another such that they are in contact with one another. As a result of the direct contact between the housing part and the shaft element in the region of the bearing portion, friction occurs between the two parts upon rotation of the shaft element. However, this friction is acceptable to a certain extent for many applications. In order to avoid excessive friction between the housing part and the shaft element, however, there is no contact between the two parts away from the bearing portion. Thus, there is an air gap between the shaft element and the housing part away from the bearing portion. In this way, the bearing portions can also be oriented with respect to one another in order to set the degree or intensity of friction as desired by way of production measures or construction measures.

The housing part may be configured as a part that is separate from the housing of the sensor device and can be connected to the housing by overmolding or can be integrated into the housing. Alternatively, the housing part represents a region or portion of an integrally formed housing. The first and second portions of the housing part are preferably separated from one another such that it is not possible for moisture in the form of water, oil or comparable media to flow through from one portion to the other, for example in order to protect the sensor element therefrom.

The sensor device according to an aspect of the invention is advantageously developed in that the first bearing portion is shaped in a manner narrowing in a stepped manner. The stepped embodiment of the bearing portion has the advantage of easy producibility. Furthermore, this embodiment has the advantage that the region toward the second shaft end can be sealed off by means of the contact faces between the shaft element and the housing part. In this way, the region between the magnet element and the housing can be effectively protected from dirt and moisture which could possibly negatively affect the action of the sensor element. Furthermore, the stepped embodiment of the bearing portion allows the axial spacing between the magnet element and the sensor element to be set as precisely as possible.

The sensor device according to an aspect of the invention is advantageously developed in that the first bearing portion has a substantially horizontally extending contact face and a substantially vertically extending contact face, which immediately adjoin one another. By means of the contact faces oriented substantially orthogonally to one another, it is particularly easy to mount the shaft element.

The sensor device according to an aspect of the invention is advantageously developed in that the housing part and the shaft element are produced with a precise fit in the region of the first bearing portion. As a result of the precision fit, high positional accuracy and good sealing off of the region of the second shaft end are achieved.

The sensor device according to an aspect of the invention is advantageously developed in that the position of the horizontal contact faces is produced with a precise fit. In this way, the axial spacing between the magnet element and the sensor element can be set particularly precisely. In this connection, a precise fit is therefore intended to mean that the tolerance range for producing or machining the region or portion in question with respect to other regions is significantly smaller, in order to achieve greater precision of the dimensions and relative positions.

The sensor device according to an aspect of the invention is advantageously developed in that the second shaft end is not in contact with the housing part. Although the spacing between the magnet element and the sensor element is increased as a result, friction upon rotation of the shaft element is avoided as a result of a small air gap between the housing part and the second shaft end, this allowing smoother rotation of the shaft element overall.

The sensor device according to an aspect of the invention is advantageously developed in that the housing part and the shaft element each have, between the first shaft end and the first bearing portion, a second bearing portion for radially mounting the shaft element. According to this embodiment, the shaft element is mounted only by the two bearing portions and is also only in contact with the housing part in the region of the bearing portions. As a result of the further radial mounting at the second bearing portion, tilting of the shaft element about the longitudinal axis is effectively prevented. In this way, it is possible to keep the shaft element in a particularly accurate position relative to the housing part and thus also to the sensor part. The shaft element and the housing part are advantageously produced with a precise fit with respect to one another in the region of the second bearing portion. Although further radial bearing portions are also conceivable, the combination of the first and second bearing portions provides the ideal solution for cost-effective and secure mounting of the shaft element.

The sensor device according to an aspect of the invention is advantageously developed in that the shaft element is formed, in the second bearing portion, with a protrusion having a contact face, extending substantially parallel to the longitudinal axis of the shaft element, with respect to the housing part. In this way, it is particularly easy to realize the mounting on the second bearing portion.

The sensor device according to an aspect of the invention is advantageously developed in that the surface of the housing part or shaft element has a lubricant at least in the region of one bearing portion. In this way, the friction between the shaft element and the housing part can be effectively reduced. For example, the contact face on the shaft element or on the housing part could be provided with a lubricating layer, for example PTFE, applied to the surface. However, it is also conceivable to form the shaft element or the housing part itself by means of a material that is as low-friction as possible, at least in the region of one bearing portion.

The sensor device according to an aspect of the invention is advantageously developed in that the housing part has contact faces formed in a segmented manner in the region of at least one bearing portion, wherein the contact faces are separated from one another by means of grooves or recesses. The segmented contact faces, or contact faces that are configured in a segmented manner, moreover ensure the mounting of the shaft element on the housing part. By means of the clearances between the contact faces, the size of the overall contact face is reduced as a whole, such that the friction between the shaft element and the housing part is reduced. Furthermore, the clearances or grooves have the advantage that dirt particles or the like do not collect in the region of the contact faces but are conveyed into the grooves by the rotation of the shaft element. The grooves arranged between the contact faces can also be used as stores for lubricant.

The sensor device according to an aspect of the invention is advantageously developed in that the grooves or recesses are provided to receive a lubricant. The bearing portions are provided with a lubricant before the shaft element is mounted in the housing part. By way of the grooves, a greater quantity of lubricant can be introduced into the bearing portions.

The sensor device according to an aspect of the invention is advantageously developed in that the fit in the region of the bearing portion is designed so as to seal off the region of the second shaft end.

The sensor device according to an aspect of the invention is advantageously developed in that the sensor element has a chip, wherein the housing part has, in the first portion, a recess for receiving the chip or an electronic component for sensing the magnetic field of the magnet element, wherein the position of the recess is aligned precisely with the position of the shaft element. This ensures that the sensor element also maintains the relative position with respect to the magnet element throughout the service life of the sensor device.

The sensor device according to an aspect of the invention is advantageously developed in that the position encoder has a lever element which is arranged at the first shaft end and is formed integrally with the shaft element, wherein, in the region between the shaft element and the lever element, a recess is formed, via which the position encoder is able to be latched in place in the housing part. In this way, the position encoder can be mounted with particularly little effort. The latching of the position encoder in place on the housing part in the connecting region between the lever element and the shaft element furthermore has the advantage that the penetration of dirt and moisture into the housing part can be prevented in part. Depending on the application, this region can also be provided with an additional seal.

An aspect of the invention also covers using the sensor device as a ride-height sensor. The abovementioned embodiments are particularly well suited in particular for use in a ride-height sensor, since in this case the rotational speeds and rotary strokes are relatively small and thus contact mounting between the shaft element and the housing part is durable even over a relatively long service life.

BRIEF DESCRIPTION OF THE DRAWINGS

The invention is described in more detail in the following text by way of figures and an exemplary embodiment. In the figures.

DETAILED DESCRIPTION OF THE PREFERRED EMBODIMENTS

For the sake of clarity, some reference signs have been omitted from some figures. These missing reference signs should be mentally added from the other figures. Therefore, the description is also likewise applicable to the elements that are sometimes not provided with reference signs.

Figure 1:
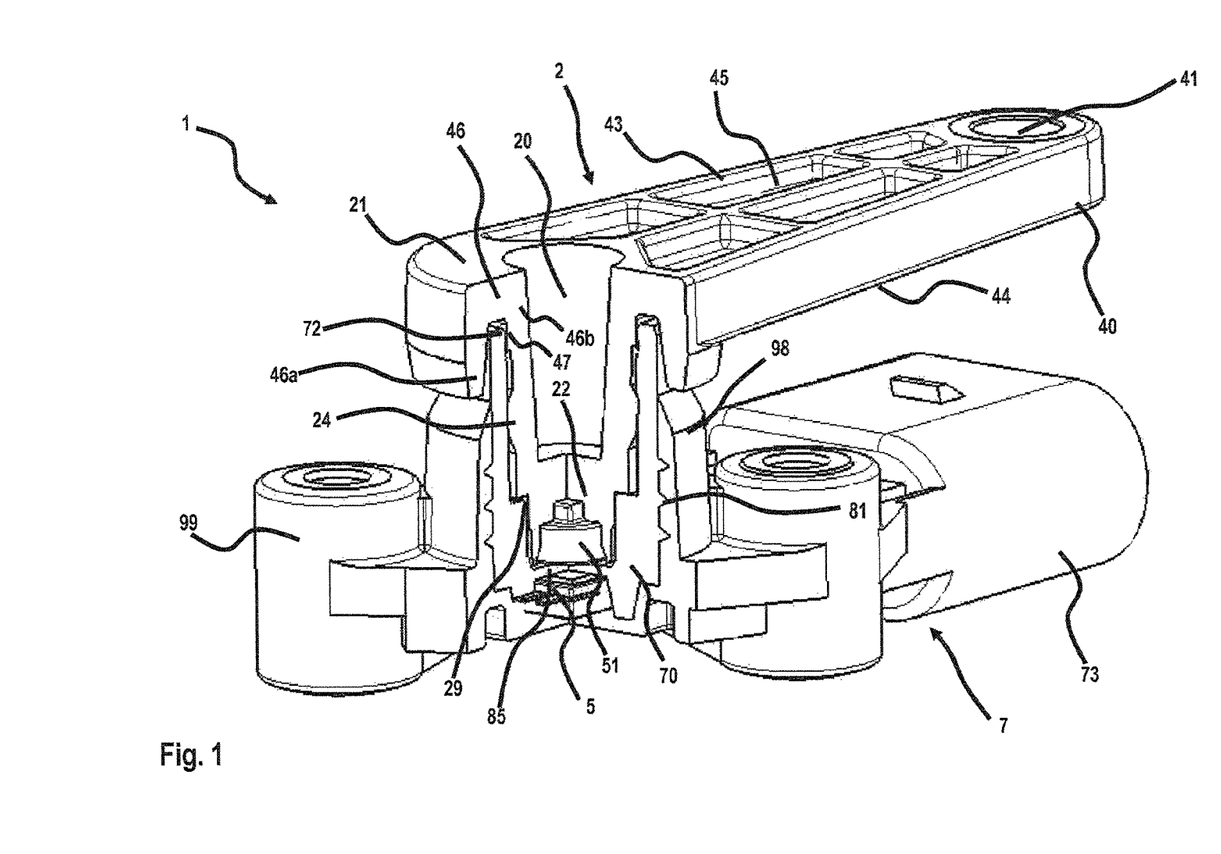
FIG. 1 shows a perspective view in partial section of a first exemplary embodiment of the sensor device according to the invention.

FIG. 1 shows a sensor device 1 for sensing a rotation, having a position encoder 2, a sensor element 5, and a housing part 70 integrated into a housing 7. The sensor device 1 is used as a ride-height sensor, in particular for determining the height of a motor vehicle body.

To this end, the sensor device 1 is connected to a height adjusting device of the motor vehicle, for example a strut. When the height of the vehicle body is adjusted, the height of the adjustment can be determined by means of the sensor device 1. In this application, the sensor device is exposed to dirt and water since it is arranged in the region of the wheels. Therefore, it is necessary to protect the functionally essential parts of the sensor device 1 from external influences. This relates in particular to the electronics. In particular with regard to a long service life, it is essential for the interior of the sensor device 1 to remain substantially dry.

The position encoder 2 has a shaft element 20 with a first and a second shaft end 21, 22. The position encoder 2 furthermore has a lever element 40 which is arranged at the first shaft end 21. The shaft element 20 and the lever element 40 are integrally formed. The lever element 40 and the shaft element 20 are preferably manufactured as an injection-molded part. At the free end, the lever element 40 has a bore 41 (see FIG. 2) via which the lever element 40 is able to be coupled in a form-fitting manner to a moving element, for example a strut. The shaft element 20 is arranged at the opposite end of the lever element 40 from the free end. In this way, the movement of the moving element can be transmitted to the shaft element 20 via the lever element 40, whereupon the shaft element 20 rotates.

The lever element 40 is configured in the form of a flat bar. The upper and lower sides 43, 44 of the lever element 40 are formed in a substantially planar manner. The first embodiment, shown in FIGS. 1-3, has a plurality of recesses 45 on the upper and lower sides 43, 44 of the lever element 40, in order to achieve a uniform wall thickness of the lever element 40. The two ends of the lever element are rounded. Formed at the second end of the lever element is a collar 46 via which the lever element and the shaft element 20 are able to be latched in place on the housing part 70. In this case, the collar 46 has an outer lip 46a and an inner lip 46b which are connected together via the upper side or top side 43 of the shaft element and in this way form a U-shaped collar. In the region of the upper edge 72 of the housing part 70, the inner lip 46b has a small protrusion 47 (see for example FIG. 3) in order to latch the lever element 40 and the shaft element 20 in place on the housing part 70. The shaft element 20 and the collar 46 are configured such that the lever element 40 does not sit on the upper edge 72 of the housing part, but rather a small air gap arises between the collar in the transition region of the lips 46a, 46b and the top edge 72 of the housing part.

The shaft element 20 is oriented perpendicularly to the lever element 40. It extends away from the underside 44 of the lever element, wherein the transition from the inner lip 46b to the shaft element 20 is smooth. In a non-integral embodiment of the shaft element 20 and of the lever element 40, the connection between the two elements could be realized by means of a plug connection or the like. The shaft element 20 is formed in a cylindrical or slightly conical manner and has a shape that narrows slightly toward the shaft end 22. The radius of the shaft element 20 is selected such that there is no contact between the shaft element 20 and the inner side 74 of the housing part 70. Rather, the shaft element 20 has two bearing portions 24, 29, via which the shaft element 20 bears on the inner side 74 of the housing part 70 and thus mounts the shaft element 20, but also the lever element 40 indirectly in the radial and axial direction on the housing part 70, or housing 7.

The first bearing portion 24 is arranged approximately in the middle between the second shaft end 22 and the protrusion 47 on the inner lip 46b. The first bearing portion 24 mounts the shaft element 20 in the radial direction, this being illustrated in FIG. 3 by the arrows 25. To this end, the first bearing portion 24 has a protrusion that protrudes from the lateral surface of the shaft element 20 and has a contact face 26 extending parallel to the inner side 74 of the housing part 70. Provided between the contact face 26 and the lateral surface of the shaft element 20 are continuously extending transition surfaces, in order to prevent tilting or the like.

Figure 3:
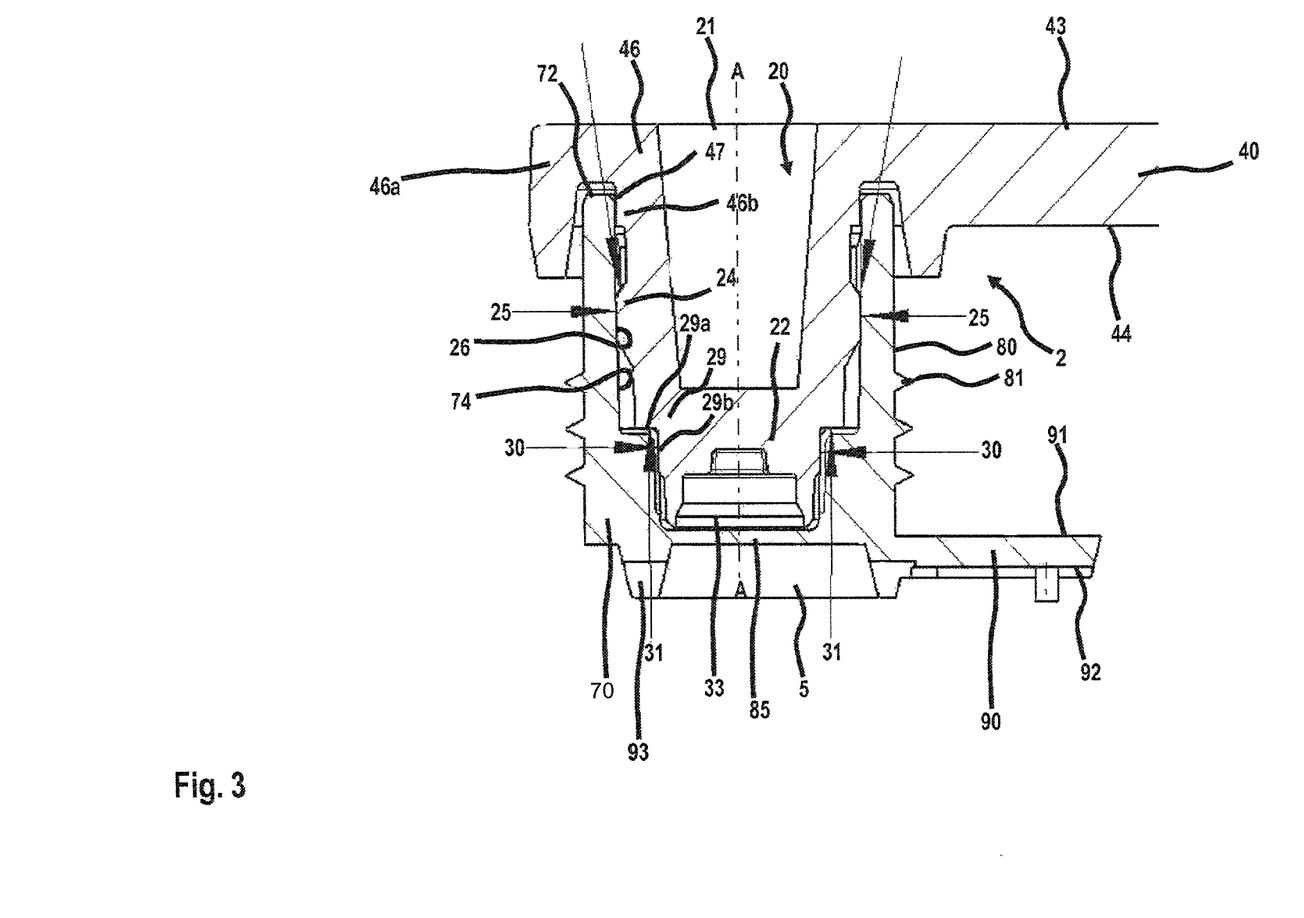
FIG. 3 shows a sectional view of a subregion of the parts shown in FIG. 2.

The second bearing portion 29 is arranged in a manner spaced apart from the first bearing portion 24 in the axial direction and is located in the region of the second shaft end 22 of the shaft element 20. The second bearing portion 29 has a portion that is shaped in a manner narrowing toward the shaft end. In this case, the shaft element 20 bears on the housing part. In the exemplary embodiment, the second bearing portion is configured as a shaft ledge which interacts with a corresponding blind hole in the housing part 70 in order to mount the shaft element 20 both in the radial and in an axial direction, as is illustrated in FIG. 3 by the arrows 30, 31. The narrowing portion is thus formed in a manner narrowing in a stepped manner in this exemplary embodiment. It has a face 29a extending transversely to the longitudinal axis of the shaft element 20, and a face 29b extending parallel to the inner side 74 of the housing part 70, said faces immediately adjoining one another. For the sake of clarity, the reference signs are only indicated in FIG. 3. The face 29b extending parallel to the inner side 74 also extends substantially parallel to the longitudinal axis A of the shaft element 20. The faces, or contact faces 29a, 29b are arranged substantially orthogonally to one another, such that the shaft element 20 forms a perpendicular ledge. It is conceivable to provide the transition between the contact faces 29a, 29b with a small rounding. It is not necessary for the shaft element 20 to bear on the housing part 70 in the region of the transition between the contact faces 29a, 29b. As can be seen in FIG. 3, the housing part 70 also has a rounded edge in this region, this being advantageous for injection-molding reasons. However, it is also conceivable to provide diagonal faces, several steps or a combination of diagonal faces and stepped portions, in order to achieve radial and axial mounting of the shaft element 20.

The second shaft end 22 in turn is formed such that it is not in contact with the housing part 70. As can be seen in FIG. 3, an air gap arises between the second shaft end 22 and the housing part 70, in order to avoid friction between the second shaft end and the housing part 70. Also provided at the second shaft end 22 is a recess 33 for receiving a magnet element 51. The recess 33 is configured in a multistep manner, representing a negative of the shape of the magnet element 51. The magnet element 51 and the recess 33 are configured such that the magnet element 51 terminates flush with the end face of the shaft element 20.

Advantageously, the shaft element 20 is produced with a precise fit in the region of the bearing portions 24, 29. This relates to the tolerance with regard to the position relative to the longitudinal axis A of the shaft element. In particular, it is advantageous to produce the horizontal contact face 29a with a precise fit, or with a low tolerance, with regard to the spacing from the end face of the second shaft end 22. Furthermore, the precision fit also relates to the radial dimensions of the contact faces 29b and 26 of the first and second bearing portions 24, 29, in order to achieve fixed mounting with simultaneously low friction. The friction can also be reduced for example by means of lubricant, a suitable material or material pair of the housing part 70 and shaft element 20. However, a high precision fit furthermore has the advantage that the region of the second shaft end is able to be sealed off without additional sealants.

Figure 2:
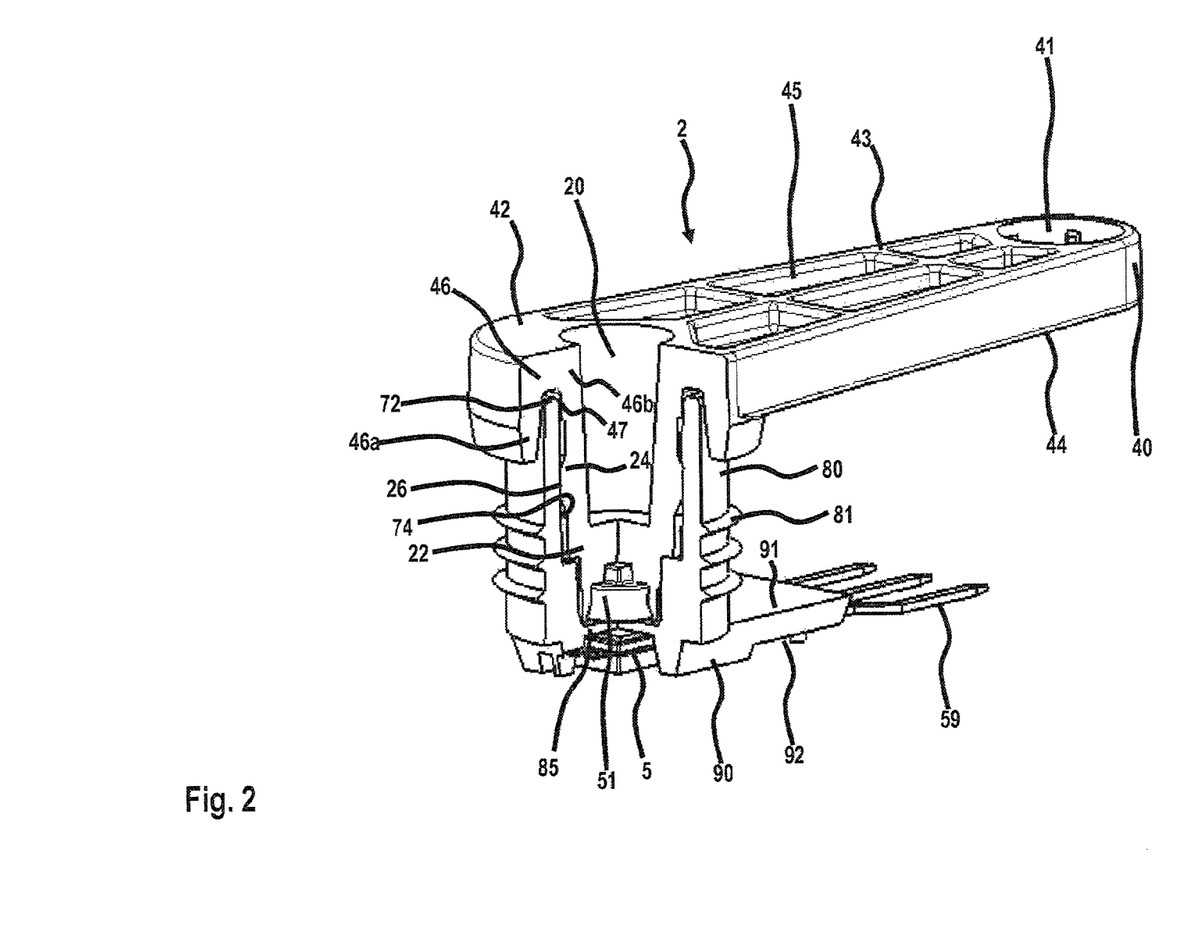
FIG. 2 shows a perspective view in partial section of parts of the sensor device.

As clearly illustrated in FIG. 2, the housing part 70 is configured to receive the shaft element 20 and the sensor element 5. The housing part 70 is able to be divided into two portions 80, 90, wherein the first portion is configured to receive the shaft element 20 and the second portion 90 is substantially configured to receive the sensor element 5. There is no passage between the two portions 80, 90, and so it is impossible for moisture to penetrate from the first portion into the second portion 80, 90 of the housing part 70. On the contrary: a wall 85 separates the cavity which is intended to receive the shaft element 20 from the second portion 90 of the housing part 70.

Figure 4:
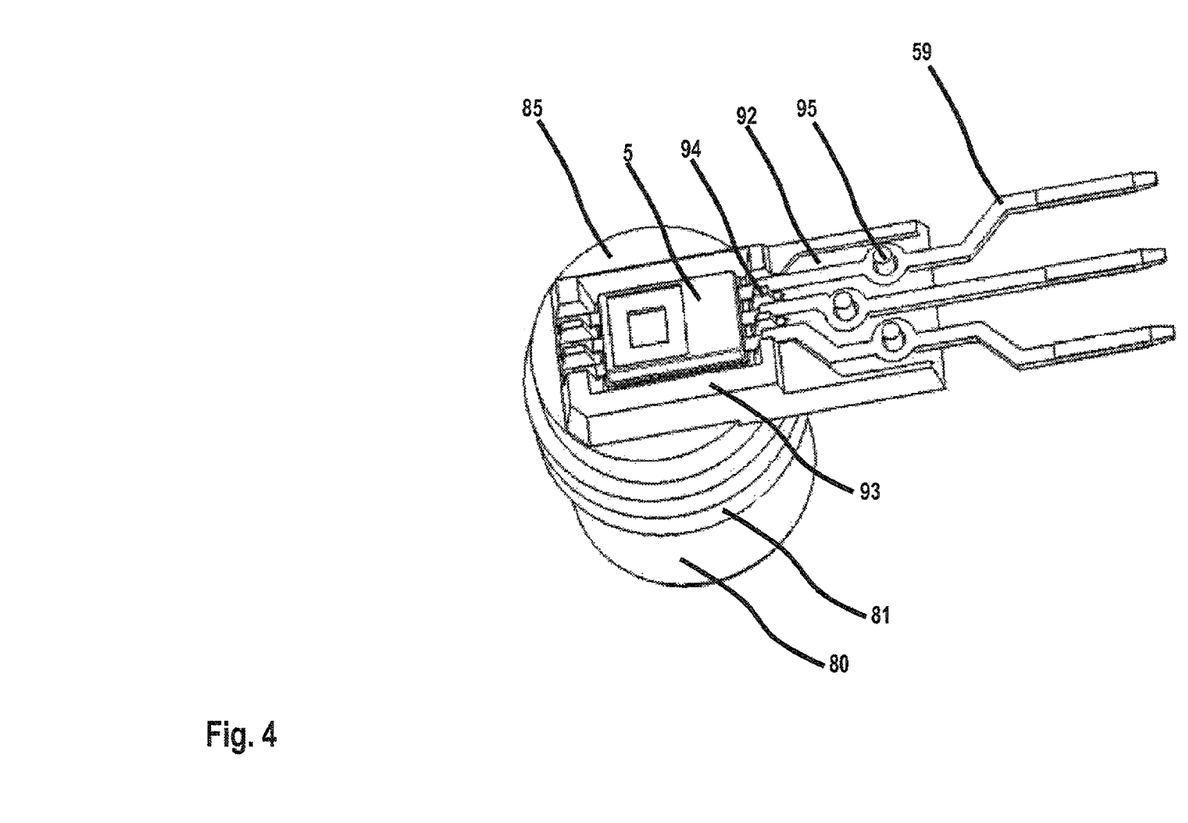
FIG. 4 shows a perspective view of the underside of the housing part with a sensor element.

The first portion 80 of the housing part 70 has a cylindrical basic shape (see FIG. 4). The outer face of the first portion extends substantially in a planar manner, wherein a plurality of triangular ribs 81 are arranged on the outer lateral surface. These ribs 81 serve to anchor the housing part 70 within the housing 7, as can be seen in FIG. 1. Furthermore, the first portion has a recess or a cavity in which the shaft element 20 is received. The shaping of the cavity is configured in order to allow mounting of the shaft element 20, as described above.

The second portion 90 of the housing part 70 is formed in a substantially platelike manner and arranged on the end side of the first portion, or on the wall 85, which is located opposite the opening. As can be seen in FIGS. 2 and 3, the top side 91 of the second portion is configured in a substantially planar manner. By contrast, the underside 92 has a profiled structure in order to receive the sensor element 5. Reference is made to FIG. 4 in this regard. It can be seen therein that the underside 92 has an edging 93 which forms a recess into which the sensor element 5 is able to be inserted. Furthermore, a plurality of riblike and pinlike protrusions 94, 95 are provided, such that conductor tracks 59 of the sensor element 5 are able to be positioned exactly and are held in the intended position. The underside 92 of the second portion 90 is open toward the outside, such that the sensor element 5 is able to be inserted easily into the recess. The housing part 70 is overmolded together with the sensor element and the shaft element 20. A cover for the sensor element 5 is not necessary.

The housing 7 of the sensor device 1 has a plurality of fastening members 99, of which only one is indicated by way of example in FIG. 1, via which the housing 7 is able to be fastened to a motor vehicle by means of screws or the like. Furthermore, the housing 7 has a sleeve 73, configured in an oval manner, which serves to receive a plug connection. In the sleeve 73, it is possible for example to accommodate a plug for a circuit board, which is connected to the conductor tracks 59 of the sensor element 5. This sleeve 73 is adjoined by a portion 98 enclosing the housing part 70. This portion 98 encloses the housing part 70 virtually completely apart from a region which is comprised by the collar 46. In particular, the first portion 80 of the housing part 70 is also enclosed by the housing 7, in particular overmolded therewith. In this way, the wall of the first portion 80 of the housing part 70 is pressed against the bearing portions 24, 29 of the shaft element 20. This ensures that the second bearing portion 24 bears directly on the inner side 74 of the housing part 70.

Figure 5:
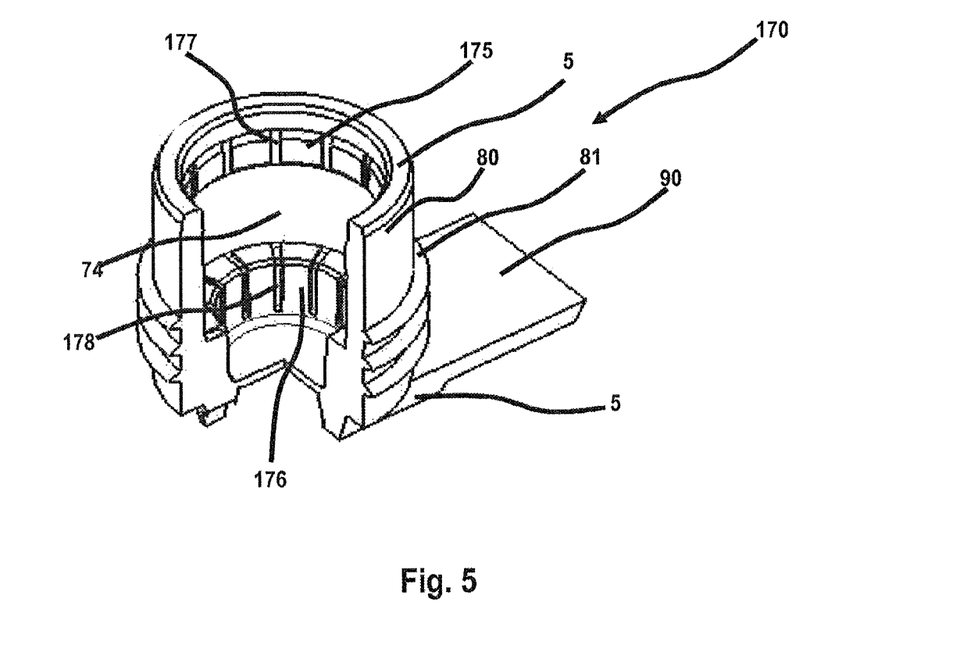
FIG. 5 shows a perspective view in partial section of the housing part of a second exemplary embodiment.
Figure 6:
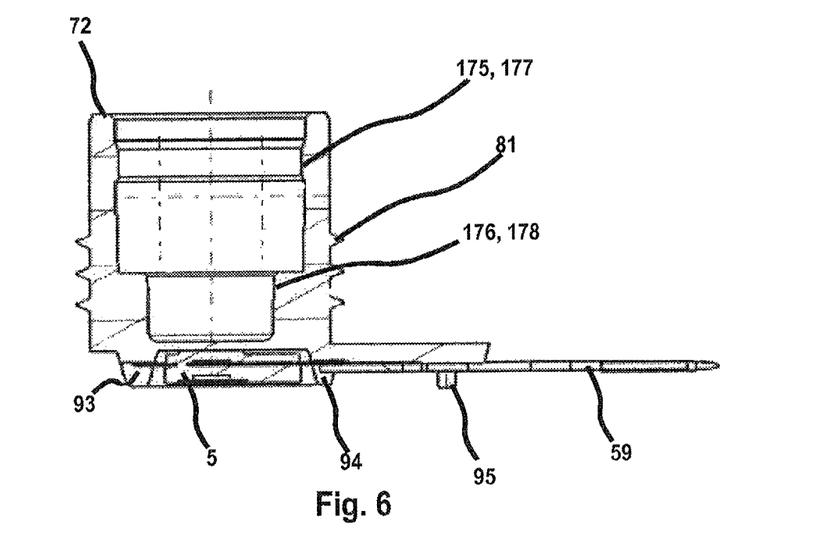
FIG. 6 shows a cross-sectional view of the housing part from FIG. 5.

FIGS. 5 and 6 illustrate a second exemplary embodiment which differs substantially by way of a different design of the inner side 74 of the housing part 70. Therefore, the abovementioned reference signs are used in the following text as long as the elements are identical elements.

According to the second exemplary embodiment, the housing part 170 has, on the inner side 74 of the recess, a plurality of contact faces 175, 176 which are formed in a segmented manner and which interact with the first and second bearing portions 24, 29 of the shaft element 20. In the region of the bearing portions 24, 29, the inner face 74 is subdivided into a plurality of contact face segments 175, 176 by means of grooves 177, 178. The grooves 177, 178 extend substantially parallel to the longitudinal axis A of the shaft element, or in a vertical direction. In the region of the first bearing portion 24, a plurality of contact faces 175, configured in a rectangular manner, are thereby produced in a manner extending around the circumferential face, said contact faces 175 being interrupted by means of the grooves 177. In the region of the second bearing portion 29, the grooves extend in a manner corresponding to the shape of the blind hole, or in a stepped manner, such that the contact faces 176 are separated from one another here, too. The depth of the grooves 177, 178 can vary depending on the application. They serve as a lubricant reservoir. Furthermore, these grooves can also be used in order to receive dirt particles or the like. As a whole, less friction arises in this way upon rotation of the shaft element 20 within the housing part 70.

The claims associated with the application do not represent any renunciation of the achievement of further protection.

If it is found in the course of the procedure that a feature or a group of features is not absolutely necessary, the applicant's aim is now already to draft at least one independent claim which no longer has the feature or group of features. This may involve, for example, a subcombination of a claim present on the filing date or a subcombination, limited by further features, of a claim present on the filing date. Such claims or combinations of features which are to be newly drafted should be understood as also being covered by the disclosure of this application.

It should furthermore be noted that configurations, features and variants of the invention which are described in the various embodiments or exemplary embodiments and/or shown in the figures are combinable with one another as desired. Individual features or several features can be exchanged with one another as desired. Combinations of features which result therefrom should be understood as also being covered by the disclosure of this application.

Back-references in dependent claims should not be understood as being any renunciation of the achievement of independent, objective protection for the features of the dependent claims with back-references. These features can also be combined with other features as desired.

Features which are disclosed only in the description or features which are disclosed in the description or in a claim only in conjunction with other features can in principle be of independent significance which is essential to the invention. Therefore, they can also be adopted individually into claims for delimitation from the prior art.

The invention claimed is:

1. A sensor device for sensing a rotation, comprising:
   a position encoder having a shaft element extending in an axial direction and which has a first and a second shaft end, wherein the rotation to be sensed is introduced via the first shaft end, and wherein the shaft element contains a magnet element at the second shaft end,
   a sensor element for sensing the rotation of the magnet element, and
   a housing part having at least two portions that are separated from one another, wherein the shaft element of the position encoder is mounted on the first portion and the sensor element is arranged in the second portion,
   wherein the housing part and the shaft element each have (i) a first bearing portion in the region of the second shaft end which is shaped in a manner narrowing toward the shaft end and at which the shaft element bears on the housing part in order to mount the position encoder on the housing part, the first bearing portion having a substantially axially extending contact face which contacts the housing part to seal off the region of the second shaft end, and (ii) a second bearing portion between the first shaft end and the first bearing portion for radially mounting the shaft element, the second bearing portion of the shaft comprising a protrusion having a contact face, extending substantially parallel to the longitudinal axis of the shaft element, with respect to the housing part, the protrusion of the second bearing portion being separated from the first bearing portion by a lateral surface of the shaft.

2. The sensor device as claimed in claim 1, wherein the first bearing portion is shaped in a manner narrowing in a stepped manner.

3. The sensor device as claimed in claim 2, wherein the first bearing portion further has a substantially horizontally extending contact face which immediately adjoins the substantially axially extending contact face.

4. The sensor device as claimed in claim 1, wherein the first bearing portion further has a substantially horizontally extending contact face which immediately adjoins the substantially axially extending contact face.

5. The sensor device as claimed in claim 4, wherein the position of the substantially horizontally extending contact face is produced with a precise fit.

6. The sensor device as claimed in claim 1, wherein the housing part and the shaft element are produced with a precise fit in the region of the first bearing portion.

7. The sensor device as claimed in claim 1, wherein the second shaft end is not in contact with the housing part.

8. The sensor device as claimed in claim 1, wherein the surface of the housing part or shaft element has a lubricant at least in the region of one of the first and second bearing portions.

9. The sensor device as claimed in claim 1, wherein the housing part has contact faces formed in a segmented manner in the region of at least one of the first and second bearing portions, wherein the contact faces are separated from one another by grooves.

10. The sensor device as claimed in claim 9, wherein the grooves are provided to receive a lubricant.

11. The sensor device as claimed in claim 1, wherein the fit in the region of the second bearing portion is designed so as to further seal off the region of the second shaft end.

12. The sensor device as claimed in claim 1, wherein the sensor element has a chip, wherein the housing part has, in the second portion, a recess for receiving the chip, wherein the position of the recess is aligned precisely with the position of the shaft element.

13. The sensor device as claimed in claim 1, wherein the position encoder has a lever element which is arranged at the first shaft end and is formed integrally with the shaft element, and wherein, in the region between the shaft element and the lever element, a recess is formed, via which the position encoder is able to be latched in place in the housing part.

14. The sensor device as claimed in claim 1 for use as a ride-height sensor.

15. The sensor device as claimed in claim 1, wherein the second shaft end includes a recess which receives the magnet element, the recess having a multistep shape.

* * * * *